United States Patent [19]

Nishikawa et al.

[11] Patent Number: 4,583,211

[45] Date of Patent: Apr. 15, 1986

[54] FREQUENCY DETECTING CIRCUIT FOR DIGITAL INFORMATION REPRODUCING SYSTEM

[75] Inventors: Meisei Nishikawa; Yukio Nakamura, both of Yokohama; Tadashi Kojima, Yokosuka, all of Japan

[73] Assignee: Tokyo Shibaura Denki Kabushiki Kaisha, Kawasaki, Japan

[21] Appl. No.: 478,641

[22] Filed: Mar. 24, 1983

[30] Foreign Application Priority Data

Jun. 15, 1982 [JP] Japan .............................. 57-102813
Jun. 15, 1982 [JP] Japan .............................. 57-102815

[51] Int. Cl.⁴ ..................... G06M 3/00; G11B 17/00; G11B 19/24
[52] U.S. Cl. ..................................... 369/59; 329/106
[58] Field of Search ....................... 369/59; 360/44, 46, 360/51, 67; 307/234, 518; 328/111; 377/39, 44; 329/104–107

[56] References Cited

U.S. PATENT DOCUMENTS

| | | | |
|---|---|---|---|
| 3,949,199 | 4/1976 | Odom .............................. | 377/44 X |
| 4,397,011 | 8/1983 | Ogawa ............................ | 369/59 X |
| 4,423,498 | 12/1983 | Kimura et al. .................... | 369/59 X |
| 4,466,089 | 8/1984 | Wachi .............................. | 369/59 |

OTHER PUBLICATIONS

"Digital Audio Disc", The Journal of The Acoustical Society of Japan, vol. 38, No. 12., 1982, pp. 786–794, Ryuji Iwashita.

Primary Examiner—Robert L. Richardson
Attorney, Agent, or Firm—Cushman, Darby and Cushman

[57] ABSTRACT

A circuit is disclosed which is applied for a digital audio disk (DAD) system for detecting a maximum inverting period of a digital audio signal optically read out from the DAD. The audio signal is prestored in the DAD so as to have the maximum and minimum inverting periods specially set by an eight to fourteen modulation (EFM). The detection circuit includes an edge detector for detecting pulse edges of the digital audio signal, a counter for counting pulse edge intervals on the basis of a modulating clock signal, a counter type register, and a comparator. When the register contents of the counter type register is smaller than the count value of the counter, the comparator produces a pulse signal by which said register updates the contents of the register by "1". Repeating this operation, a maximum inverting period value of the digital audio signal is obtained in a fixed period of time.

10 Claims, 7 Drawing Figures

FIG. 4
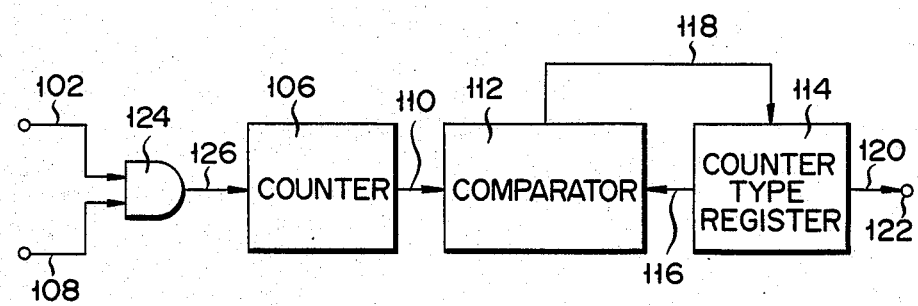
FIG. 5
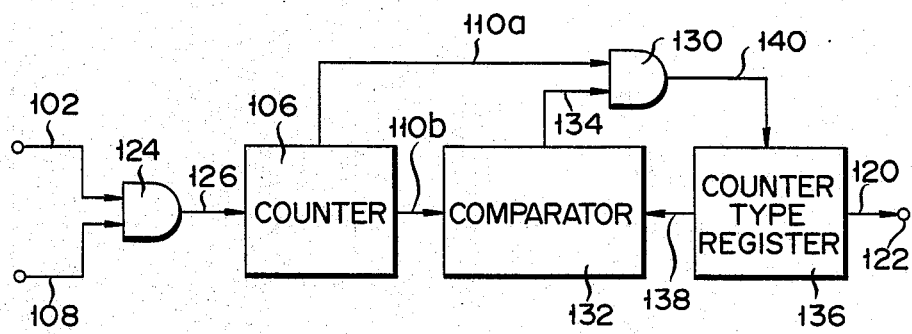
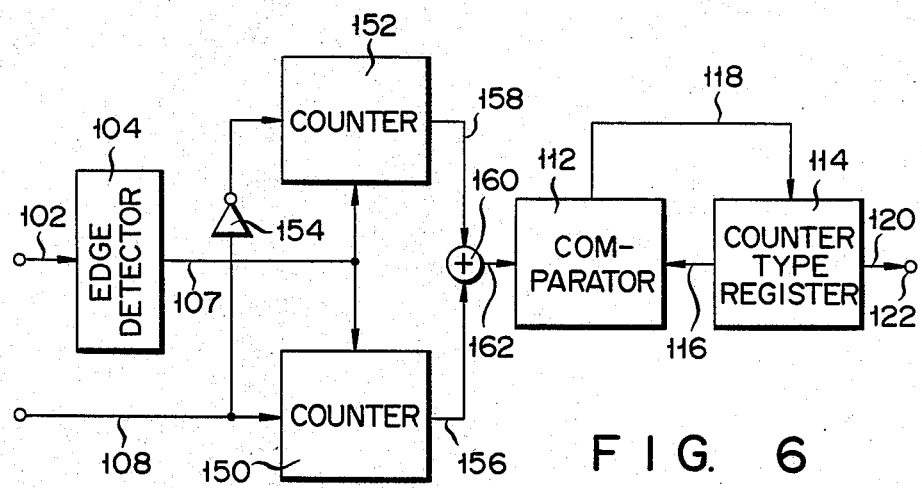
FIG. 6

FREQUENCY DETECTING CIRCUIT FOR DIGITAL INFORMATION REPRODUCING SYSTEM

BACKGROUND OF THE INVENTION

The present invention relates generally to a frequency detecting circuit. Particularly, the present invention relates to a frequency detecting circuit applied in a digital information reproducing system such as a digital audio disk system, which detects, in an information signal-demodulating mode, an inverting period, that is, the period during which the signal remains at a constant logic level without inverting, of the information signal stored in a recording medium so as to keep the inverting period value within minimum and maximum period limit values specially predetermined by any of some specific types of modulating techniques.

A pulse code modulation (PCM) system which converts an analog signal such as an audio signal to a digital signal has been recently developed, which takes advantage of the high quality of reproduction signals. For recording an audio signal in accordance with the PCM system, an analog signal is sampled, quantified, and coded to generate a binary signal which is then recorded on a data recording medium such as an optical disk, called a digital audio disk (DAD). At this time, after being encoded using error correction techniques, the signal is modulated by a predetermined modulation system. An eight to fourteen modulation (EFM) system, 3-position modulation (3PM) system or the like has been employed for this modulation, which uses predetermined maximum and minimum inverting periods.

For detecting the inverting period, it is necessary to obtain a frequency relative ratio of an input signal as a pulse signal and a demodulating clock signal. By convention, the frequency detection has been performed by matching phases of the input information signal and the demodulating clock signal. In this frequency detection, when the reception of the demodulating clock is temporarily stopped, the detection of the inverting period becomes impossible. This results in an unexact demodulation of the digital information signal.

SUMMARY OF THE INVENTION

Accordingly, an object of the present invention is to provide a new and improved frequency detecting circuit for a digital information reproducing system which performs a normal detecting operation with good reliability, ensuring effective demodulation of an information signal.

To achieve the above object, a frequency detecting circuit according to the present invention is applied for a system for reproducing or playing back an information signal digitally prestored in a recording medium such as an optical disk, with inverting period limit values predetermined by a given modulation technique. The frequency detecting circuit is comprised of a counter section for counting a time duration that a digital information signal holds its signal level at a given logic level, and a register section which, when the contents of the register are smaller than the time duration length of holding the given logic state of the information signal level, adds a predetermined unit value to or subtracts it from the register contents thereof, thereby to change or update the contents of the register. The register section repeates the above operation within a given period of time. With this configuration, periodic value data corresponding to an inverting period value of this signal such as a maximum inverting period or a minimum inverting period in a fixed period of time, may be obtained when demodulating the information signal.

BRIEF DESCRIPTION OF THE DRAWINGS

The present invention is best understood by reference to the accompanying drawings, in which:

FIG. 4 is a block diagram of a frequency detecting circuit which is a second embodiment of the present invention;

FIG. 5 is a block diagram of a frequency detecting circuit according to a third embodiment of the present invention, in which with a weighting of m bit, the number of bits in a counter type register is reduced;

FIG. 6 is a block diagram of a frequency detecting circuit with two counters provided in parallel at the poststage of an edge detecting circuit, which is a fourth embodiment of the present invention.

DETAILED DESCRIPTION OF THE PREFERRED EMBODIMENTS

Figure 1:
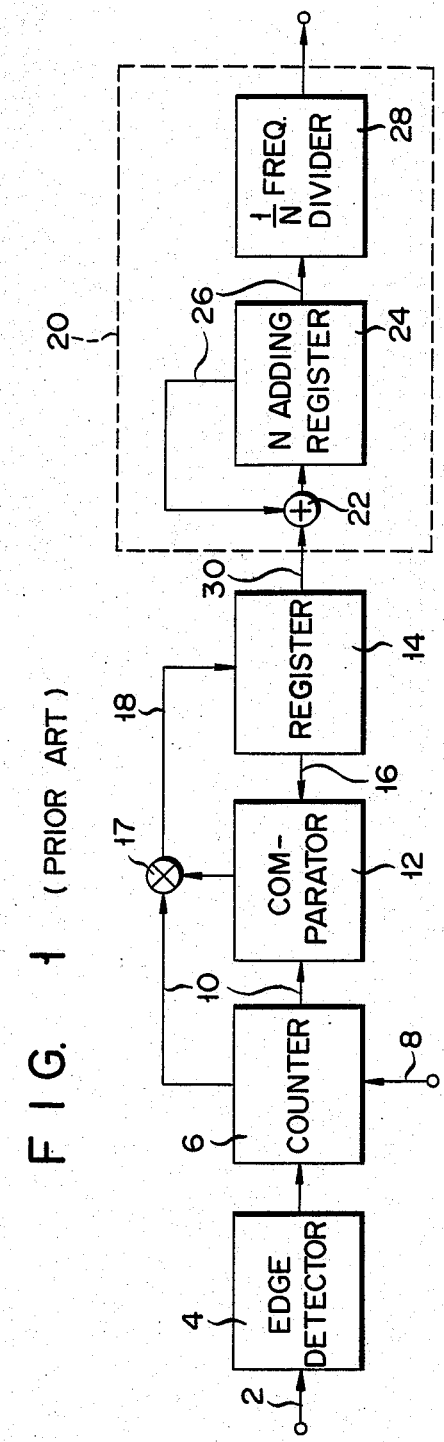
FIG. 1 is a block diagram of a prior frequency detecting circuit applied for a digital information reproducing system.

FIG. 1 shows a configuration of a prior art frequency detecting circuit for a digital information reproducing system. In the figure, an input signal 2 is applied to an edge detecting circuit 4 where its pulse edge is detected and then is applied to a counter 6. The counter 6 counts an interval between the adjacent, detected pulse edges of the input signal 2 according to a demodulating clock signal 8. A count signal 10 of the counter 6 is supplied to a comparator 12 where it is compared with a register contents signal 16 from a Tmax register 14, which stores the maximum inverting period data in a fixed period of time. During the comparing process in the comparator 12, if the count signal 10 of the counter 6 is larger than a register contents signal 16 of the Tmax register 14, the count signal 10 of the counter 6 is loaded as a new register value signal 18 to the Tmax register 14, through a transfer gate 17. In this way, a maximum inverting period (Tmax) during a predetermined period may be stored in the Tmax register 14.

The Tmax register 14 is connected to a digital integrating circuit 20, in order to prevent an erroneous detection of the maximum inverting period Tmax due to noise, burst error, and the like. As shown in FIG. 1, the output terminal of the Tmax register 14 is connected to an N adding register 24, through an adder 22. A register value data 26 of the N adding register 24 is supplied to the adder 22 and a 1/N frequency divider 28. With this arrangement, a frequency ratio output 30 derived from the Tmax register 14, which corresponds to the maximum inverting period Tmax during a period of time, and the register value 26 are subjected to an N addition processing. The result of the addition is summed again into to the N adding register 24. After the addition processing is repeated N times, the added register value 26 is divided by 1/N, and the result of the division is produced as a value of the maximum inverting period Tmax.

In the prior frequency detecting circuit of FIG. 1, for frequency detection, the phases of the input information signal 2 and the demodulating clock signal 8 are matched and the pulse edge intervals of the input signal 2 are counted using the clock signal 8. When the demodulating clock signal 8 supplied to the counter 6 temporarily disappears or cannot be received, it becomes essentially impossible to detect the inverting period value.

Further, the prior art is provided with the digital integrating circuit 20 for suppressing adverse effects by noise, for example. The provision of the digital integrating circuit 20 brings about increase of circuit components, making an overall system of the device undesirably complicated. This is more problematic particularly when the system is entirely packed in a chip by the IC technology.

A frequency detecting circuit for a digital information reproducing system according to an embodiment of the present invention will be described referring to FIGS. 2 and 3.

Figure 2:
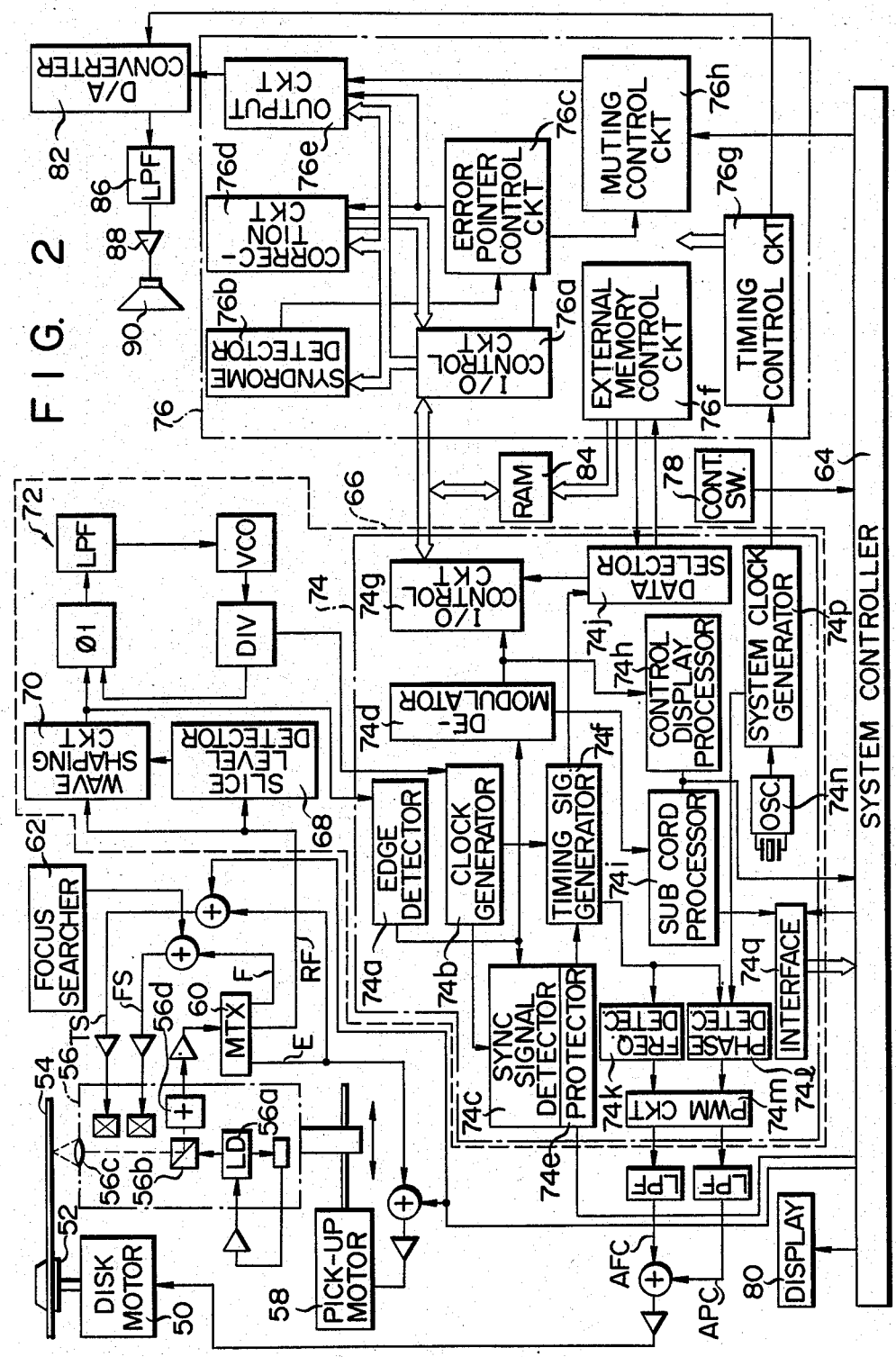
FIG. 2 is a block diagram of an overall configuration of a digital information reproducing system with a digital audio disk (DAD system)

For a better understanding of the present invention, a fundamental configuration of a digital information reproducing system, or the reproducing system using an optical digital audio disk (DAD system), is illustrated in FIG. 2.

In the DAD system of the fundamental configuration shown in FIG. 2, a rotating shaft (not shown) of a DC disk motor 50 is mechanically coupled to a turntable 52 which is then rotated. An optical disk or digital audio disk 54 mounted on the turntable 52 which is driven by the disk motor 50 is reproduced by means of an optical pickup 56. In this case, the optical pickup 56 radiates light onto the signal recorded surface of the optical disk 54 through a beam splitter 56b and an objective lens 56c. Light, which corresponds to digital PCM data of the information signal (audio signal) recorded on the disk 54 in an interleaved manner, in accordance with a predetermined modulation system, is then selectively reflected by pits (indentation portions with different reflectivities). The reflected light is guided to a 4-split photodetector 56d through the objective lens 56c and the beam splitter 56b. The photodetector 56d converts the light signal to four readout signals. The photodetector 56d is radially and linearly driven by a pickup motor 58 along the optical disk 54.

Four readout signals from the photodetector 56d are supplied to a matrix circuit 60 (to be referred to as an MTX 60 hereinafter), in which a predetermined matrix operation is performed, thereby providing a focus error signal F, a tracking error signal E and a high frequency signal RF.

The focus error signal F together with a focus search signal from a focus searcher 62 is used to drive a focus servo system FS. The tracking error signal E together with a search control signal (to be described later) supplied via a system controller 64 is used to drive a tracking servo system TS and to control linear tracking performed by the pickup motor 58.

The high frequency signal RF is supplied as a main reproduction signal component to a reproduction signal processing system 66. In the reproduction signal processing system 66 the reproduction signal is supplied to a wave shaping circuit 70 which is controlled by a slice level (eye pattern) detector 68 so as to separate an unnecessary analog component from a necessary data component. Only the data component is supplied to a PLL control circuit 72, and to an edge detector 74a of a main signal processor 74.

A sync clock pulse signal from the circuit 72 is supplied to a clock generator 74b of the main signal processor 74 for separating the sync clock pulse and for demodulating data. The sync clock pulse is used to produce a clock pulse for separating the sync signal.

The reproduction signal passing through the edge detector 74a is supplied to a sync signal detector 74c in which the sync signal is separated by the clock pulse. At the same time, the reproduction signal is EFM-demodulated by a demodulator 74d. The sync signal is supplied together with the clock pulse for separating the sync signal to a timing signal generator 74f through a protector 74e for protecting the sync signal.

The demodulated signal is supplied to an I/O control circuit 76a of another signal processing circuit 76, to be described later through an I/O control circuit 74g. At the same time, control and display signal components of the demodulated signal are supplied as subcodes to a control display processor 74h and a subcode processor 74i. Subcode data whose error is detected and corrected in the subcode processor 74i is transferred to a system controller 64 through an interface 74q.

The system controller 64 has a microprocessor interface, an IC for a driver and so on (not shown). The system controller 64 controls the DAD reproduction device in a desired state in response to an instruction signal from a control switch 78. At the same time, the system controller 64 causes a display 80 to display the subcode (e.g., index information for music to be reproduced).

A timing signal from the timing signal generator 74f is used to control the I/O control circuit 74g through a data selector 74j. At the same time, this timing signal is supplied to a PWM modulator 74m through a frequency detector 74k and a phase detector 74l. The PWM modulator 74m produces an automatic frequency control (AFC) signal and an automatic phase control (APC) signal for driving the disk motor 50 in accordance with a constant linear velocity (CLV) system.

In this case, a system clock pulse is supplied to the phase detector 74l from a system clock generator 74p which is operated in response to an oscillation signal from a quartz oscillator 74n.

The errors and interleaving of demodulation data passing through an I/O control circuit 76a of the signal processing system 76 are corrected through a syndrome detector 76b, an error pointer control circuit 76c, a correction circuit 76d and a data output circuit 76e, and the corrected demodulation data is supplied to a D/A converter 82.

In this case, an external memory control circuit 76f in cooperation with the data selector 74j controls an external memory 84 which stores necessary data for correction. The external memory control circuit 76f fetches necessary data for correction through the I/O control circuit 76a. A timing control circuit 76g supplies a timing control signal necessary for correcting an error on the basis of the system clock pulse from the system clock generator 74p.

A muting control circuit 76h performs a predetermined muting operation, both when an error is corrected and when the DAD reproduction device starts operation and finishes operation, on the basis of an output from the error pointer control circuit 76c and the control signal through the system controller 64.

In this manner, the audio reproduction signal converted to the analog signal by the D/A converter 82 is supplied to a speaker 90 through an LPF 86 and an amplifier 88.

Figure 3:
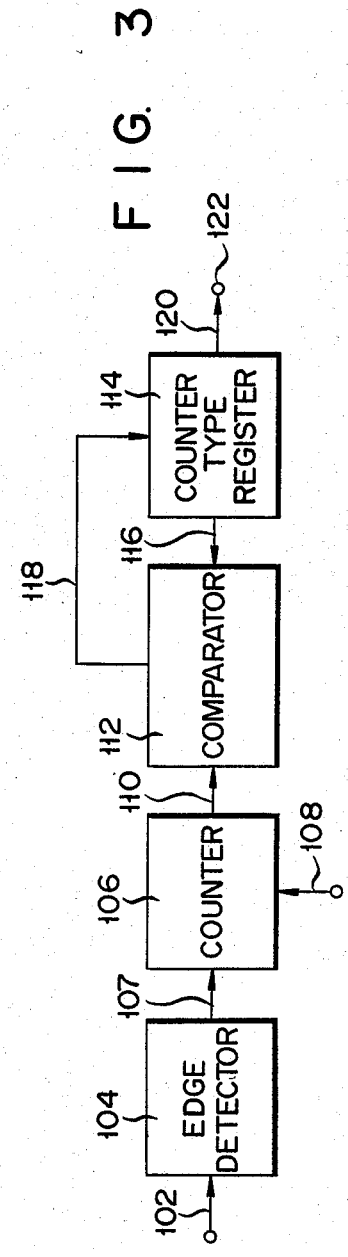
FIG. 3 is a block diagram of a frequency detecting circuit well adaptable for the DAD system of FIG. 2, which is a first embodiment of the present invention.

FIG. 3 shows a first embodiment of the present invention as used in the DAD system as mentioned above. A frequency detecting circuit shown in FIG. 3 is connected between the wave-shaped circuit 70 and the voltage-controlled oscillator included in the PLL control circuit 72. In FIG. 3, a digital information signal, or an digital audio signal 102, read out from a recording medium, such as the optical disk 54 by means of the optical pickup 56, has an inverting period falling within a range of the maximum inverting period Tmax and the minimum inverting period Tmin predetermined according to the EFM modulation system, for example. The EFM-modulated digital audio signal 102 is supplied to the edge detecting circuit 104 through the wave-shaping circuit 70 shown in FIG. 2. The edge detecting circuit 104 detects logical level changing points on a waveform of a pulse component of the digital audio signal 102, i.e. edges of the pulse component, and supplies an edge detecting signal 107 to the counter 106 provided at the succeeding stage of the edge detecting circuit 104. At the same time, a demodulating clock signal 108 is supplied to the counter 106. The counter 106 serves to sequentially count intervals between adjacent pulse edges of the digital audio signal 102 represented by the edge detecting signal 107 from the edge detecting circuit 104, on the basis of a demodulating clock signal 108. An output signal 110 from the counter 106 representing the result of the pulse edge count is supplied to the first input terminal of a comparator 112.

A counter type register 114 with a given number (n) of bits is connected to the second input terminal of the comparator 112. The counter type register 114 corresponds to a Tmax storing register and has a function of an up-counter in the present embodiment. The counter type register 114 supplies a register contents signal 116 of the register 114 per se to the second input terminal of the comparator 112. The comparator 112 compares the count result signal 110 of the edge detecting circuit 104 with the register contents signal 116, which are supplied as mentioned above. Only when the count result signal 110 supplied to the first input terminal of the comparator 112 is larger than the register contents signal 116 supplied to the second input terminal will the comparator 112 produce a pulse signal 118. The pulse signal 118 is transferred to the counter type register 114. Upon receiving the pulse signal 118, the counter type register 114 increases, by a unit value such as "1", the register contents thereof, that is, counts up or increments the contents. When the count result signal 110 is still larger than a new register signal produced from the counter type register 114 after the completion of the counting up operation, this operation is repeated in the counter type register 114. In this way, after the above operation is repeated for a predetermined period of time, the counter type register 114 produces a final register content value signal 120 as a maximum inverting period Tmax of the digital audio signal 110, which is supplied through the output terminal 122 to the PLL control circuit 72 shown in FIG. 2.

The first embodiment thus arranged may obtain a frequency ratio of the digital audio signal 102 and the demodulating clock signal 108 on the basis of the frequency data corresponding to the known maximum inverting period Tmax contained in the digital audio signal 102. Therefore, even when the demodulating clock signal 108 supplied to the counter 106 temporarily disappears or can not be received, the frequency ratio can be obtained on the basis of the frequency information during this period of no supply of the demodulating clock signal 108. Thus, interruption of the detecting operation of the inverting period value of the digital audio signal 102 is prevented. Further, in response to the pulse signal 118 produced from the comparator 112, the counter type register 114 increases the contents value of the register per se by a unit value such as "1", so as to obtain a final integrated value within a fixed period. Therefore, there is eliminated a great erroneous detection of the maximum inverting period, Tmax due to burst error of the optical disk, for example. Thus, unlike the prior art shown in FIG. 1, there is no need for provision of the integration circuit 20. Therefore, the construction of the frequency detecting circuit can be simplified, requiring a less number of circuit elements. This feature is very useful particularly for a case where an overall circuit is IC-fabricated and packed in a single IC chip.

Turning now to FIG. 4, there is shown a second embodiment of the present invention. In the figure, like reference symbols are used for designating like or equivalent portions in the first embodiment. An input signal, or a digital audio signal 102, is supplied to the first input terminal of an AND gate 124 and the demodulating clock signal 108 is supplied to the second input terminal of the AND gate 124. The output terminal of the AND gate 124 is connected to the counter 106. The AND gate 124 is provided in place of the edge detecting circuit 104 used in the FIG. 3 embodiment. The AND gate 124 logically sums the signals 102 and 108, and detects a time period during which the digital audio signal 102 holds its signal level at one of the logic levels, e.g. a logic level "H". And it generates a pulsative output signal 126 representing the length of time period during which the signal level of the digital audio signal 102 is held at the above logic level. The counter 106 performs its counting operation on the basis of the pulse output signal 126 from the AND gate 124 and supplies the count result thereof as a count result signal 110 to the first input terminal of the comparator 112. When the count result signal 110 is larger than the register contents signal 116 from the counter type register 114, the comparator 112 produces a pulse signal 118. Responsive to the pulse signal 118 the counter type register 114 increases the registor count value thereof per se by a unit value, e.g. "1". In this way, the maximum inverting period Tmax of the digital audio signal 102 within a predetermined period is detected.

In the second embodiment, time taken for detecting the maximum inverting period Tmax is relatively long (e.g. substantially twice that of the first embodiment). This feature is very useful when it is impossible to set a processing time margin in the comparator 112 and the counter type register 114 provided at the poststage.

In a third embodiment shown in FIG. 5, a count result signal component 110a corresponding to the upper m bit of the n-bit count result, signal of the counter 106 (n and m: positive integers and m is smaller than n) is divided from the n-bit count result signal in such a way as to be supplied to the first input terminal of an AND gate 130. A count result signal component 110b corresponding to n-m (n minus m) bit of the n-bit count result signal of the counter 106 is supplied to the first input terminal of a comparator 132. Accordingly, the comparator 132 requires a capacity of only n-m bits, which is smaller than n, that is, can be formed by m bits smaller. The n-m bit output signal 134 from the comparator 132 is supplied to the second input terminal of the AND gate 130. The n-m bit comparator 132 has a second input terminal connected to a counter type register 136. The bit number (n-m), which is smaller than that of the counter type register 114 shown in FIG. 4, is enough for the counter type register 136. The output terminal of the AND gate 130 is connected to the counter type register 136.

When the comparator 132 compares the count result signal component 110b from the counter 106 with a n-m bit register content signal component 138 from the counter type register 136, if the former is larger than the latter, the comparator 132 produces a n-m bit comparing result signal 134. The comparing result signal 134 is supplied to the second input terminal of the AND gate 130. The upper m bit count result signal component 110a is supplied from the counter 106 to the first input terminal of the AND gate 130. The AND gate 130 logically processes both the signals 110a and 134 and supplies an output signal 140 obtained by weighting by m bit the count result signal component 110a of n-m bit to the counter type register 136.

As described above, in the embodiment shown in FIG. 5, the data to be supplied from the counter 106 to the comparator 132 is weighted with m bits. Therefore, the number of bits of the counter type register 136 may be reduced to n-m bits. As a result, an n-m bit capacity is enough for the comparator 132. Thus, the construction of the comparator 132 can be further simplified. The m-bit corresponding to the weighting component is added to the n-m bit comparing result signal 134 from the comparator 132, through the AND gate 130. Therefore, in the counter type register 136, the maximum inverting period Tmax data substantially corresponding to n-bit is finally obtained.

In the aforementioned embodiments, for improving a detection resolution in detecting the maximum inverting period Tmax and the minimum inverting period Tmin, it is necessary to set the frequency of the demodulating clock signal at high. For example, to double the detection resolution, the demodulation clock signal with a frequency twice as high must be supplied to the counter. The counter used in this case must have a clock margin to allow it to operate in synchronism with the high frequency clock signal. The improvement of the margin of the counter is accompanied by a more complicated construction and increases of manufacturing cost of the counter. In this respect, the improvement of the clock margin is not preferable.

FIG. 6 shows a frequency detecting circuit for a digital information reproducing system which can improve the detection resolution without requiring an special performance such as the improvement of the clock margin of the counter, which is a fourth embodiment of the present invention. In FIG. 6, two counters 150 and 152 are provided in parallel at the poststage of the edge detecting circuit 104. The detection signal 107 from the digital audio signal 102 is supplied to the two counters 150 and 152. The demodulating clock signal 108 is directly supplied to the counter (first counter) 150, and is also applied to the counter (second counter) 152 through an inverter 154. The first counter 150 counts an interval between the pulse edges of the edge detection signal 107 from the edge detecting circuit 104. The second counter 152 performs the same counting operation on the basis of the demodulating clock signal inverted by the inverter 154. The count signals 156 and 158 produced from the counters 150 and 152 are added together by an adder 160 and the result of the addition is applied to the first input terminal of a comparator 112. In other words, the adder 160 adds the output signals from both the counters 150 and 152 at an instant that the edge detecting circuit 104 detects the next pulse edge of the digital audio signal 102, and supplies the adding result data signal 162 to the first input terminal of the comparator 112. When the added data 162 is larger than the register contents signal 116 from the counter type register 114, the comparator 112 produces a pulse signal 118. Responsive to the pulse signal 118, the counter type register 114 adds a unit value such as "1" to the resistor contents thereof per se, thereby updating the contents of the register. Accordingly, the resolution in frequency detection may be substantially doubled without setting at a high frequency the clock frequency of the demodulating clock signal 108. The detection resolution can be improved without increasing the frequency of the demodulating clock signal 108. Therefore, there is no need for increasing a clock margin of each of the counters 150 and 152. It is easily understood that a circuit arrangement with two counters each having a normal clock margin is more easily realized than a circuit arrangement with a single counter with a doubled clock margin.

Figure 7:
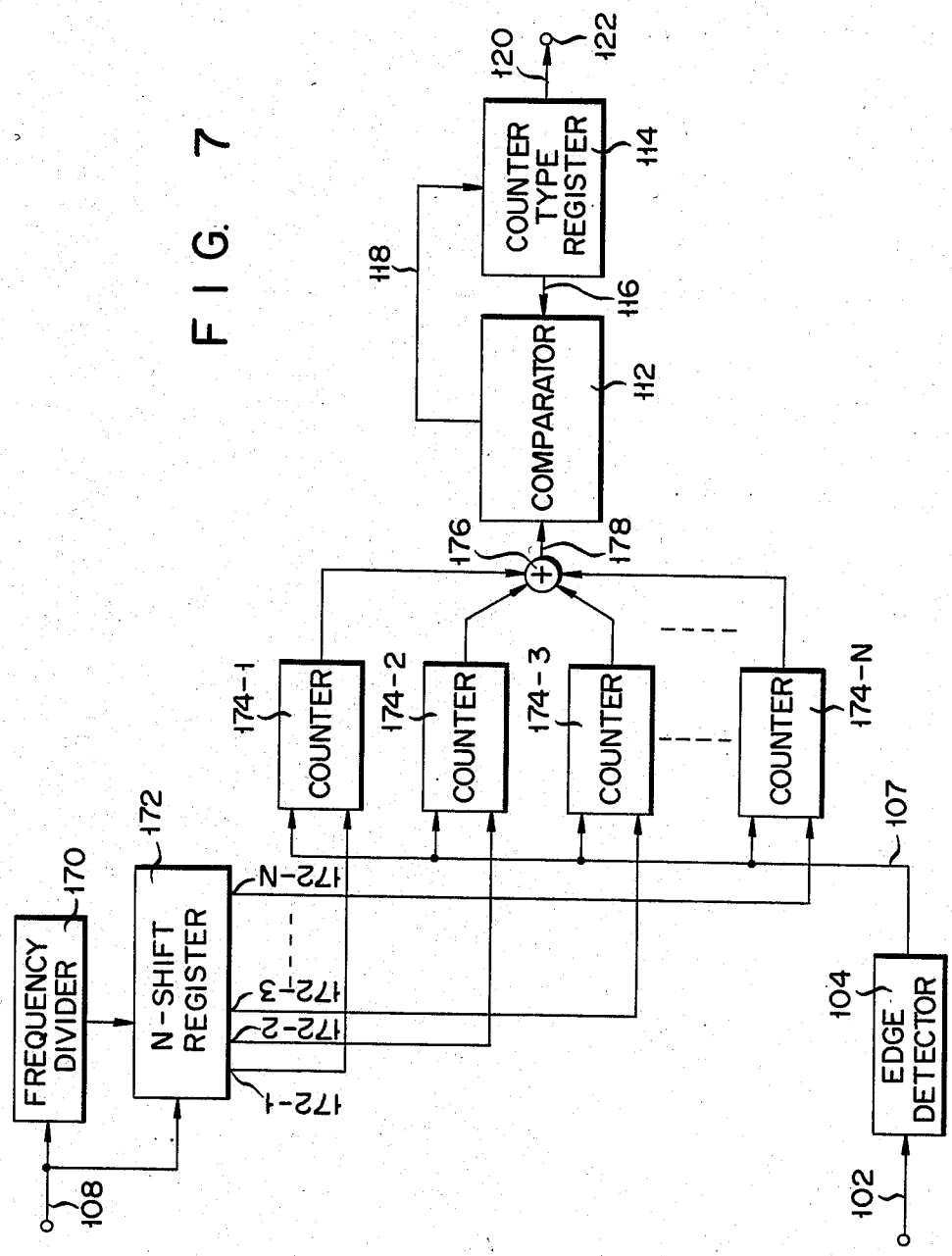
FIG. 7 is a block diagram of a frequency detecting circuit according to a fifth embodiment of the present invention, in which a demodulating clock signal is frequency-divided into a signal with a frequency of 1/N, the frequency-divided signal is supplied to counters of N arranged in parallel, and count data of N from the counters are added together.

According to a fifth embodiment of the present invention shown in FIG. 7, the demodulating clock signal 108 is supplied through a frequency divider 170 to an N-stage shift register 172. The demodulating clock signal 108 is frequency-divided into a signal with a frequency of 1/N (N: a positive integer) by a frequency divider 170. Then, the signal is sequentially shifted in an N-stage shift register 172 and produced at the output terminals of N 172-1, 172-2, ..., 172-N of the N-stage shift register 172. The output signals from the N output terminals 172-1, 172-2, ..., 172-N are respectively supplied to one of two groups of the N input terminals of counters 174-1, 174-2, ..., 174-N connected in parallel. The other input terminals of the counters 174-1, 174-2, ..., 174-N are supplied with an edge detecting signal 107 from the edge detecting circuit 104. The output signals from the counters 174-1, 174-2, ..., 174-N are connected to an adder 176 with N inputs. An added output 178 from the adder 176 is supplied to the first input of the comparator 112 as shown in FIG. 7.

According to this embodiment, a clock margin of each counter is remarkably reduced, i.e. substantially 1/N of the clock margin required for the clock signal 108. Accordingly, when a clock margin of each of the counters 174-1, 174-2, ..., 174-N is set to be equal to that of the counter 104 used in the first embodiment, a detection resolution in the frequency detection as a whole is considerably improved, by a factor of N times.

Although the present invention has been shown and described with respect to particular embodiments, various changes and modifications which are obvious to a person skilled in the art to which the invention pertains are deemed to lie within the spirit and scope of the invention. The above embodiments are each arranged so as to detect the maximum value (Tmax) of the inverting periods preset according to the EFM system. The same thing may be attained using the minimum inverting period (Tmin) in place of the maximum inverting period. In this case, the relative magnitudes among the data subjected to the comparing processing in the comparator are inverted, and a down counter is used for the counter type register.

What we claim is:

1. A circuit for detecting one of the maximum and minimum periods of time during which a digital information signal remains in one logic state, said signal being modulated and prestored in a recording medium and said maximum and minimum periods being preset according to the particular modulation system used, said circuit comprising:

counter means for: (1) receiving said digital information signal, (2) counting a time duration during which the digital information signal continuously holds its signal level at one logic level, and (3) producing count result data indicative of said time duration; and register means coupled to said counter means, for: (1) storing therein a register value corresponding to a period of time, (2) determining the time difference between said stored register value and said counter result data, (3) selectively changing said register value by a predetermined unit value which is fixed irrespective of the actual degree of said difference between said count result data and said register value, and to said stored register value to form a new register value, and (4) repeating said new register value forming operation to finally produce data equivalent to one of said maxinum; and minimum periods of time during which said digital information signals remains in one logic state.

2. The circuit according to claim 1, further comprising comparator means, connected to said counter means and to said register means, for comparing said count data with said register value to generate an output signal, thereby causing said register means to operate in response to said output signal.

3. The circuit according to claim 2, further comprising detector means connected to said counter means, for receiving said digital information signal to detect level changing points of said digital information signal between a first logic level and a second logic level, and for supplying a detection signal indicative thereof to said counter means.

4. The circuit according to claim 3, wherein said counter means receives a reference pulse signal and said detection signal to count a time interval between said logic level changing points on the basis of said reference pulse signal.

5. The circuit according to claim 2, further comprising logic operation element means connected to said counter means, for (1) receiving a reference pulse signal and said digital information signal which alternately assumes first and second logic levels, (2) detecting a time period that a signal level of said information signal is continuously held at one of said first and second logic levels, and (3) supplying a detection signal indicative of said time period to said counter means.

6. The circuit according to claim 2, wherein said counter means includes a counter circuit of n bit, where n is a positive integer, which divides the count result data of n bits into first count result data corresponding to the upper m bit where m is a positive integer which is less than n, and a second count result data of n-m bit, and separately produces first and second data, said second counter result data being supplied to said comparator means.

7. The circuit according to claim 6, further comprising AND gate means, having a first input connected to said counter means, a second input connected to said comparator means, and an output connected to said register means, for receiving said first count result data and said output signal at said first input and said second inputs thereof respectively, to produce a logically sum of said first count result data and said output signal, whereby the number of bits of said register means is reduced to lhe n-m number of bits of second count results data from said counter means.

8. The circuit according to claim 3, wherein said counter means comprises:

a first counter which receives a reference pulse signal and said detection signal and counts a time interval between said logic level changing points on the basis of said reference pulse signal;

an inverter for receiving said reference pulse signal to logically invert said reference pulse signal;

a second counter arranged in parallel with said first counter and connected to said inverter, which receives a reference pulse signal inverted by said inverter and said detection signal, and counts a time interval between said logic level changing points on the basis of said inverted reference pulse signals; and adding means connected to said first and second counters, for receiving and adding output data from said first and second counters.

9. The circuit according to claim 3, wherein said counter means comprises:

a frequency divider for receiving and frequency-dividing a reference pulse signal into a signal with a frequency of 1/N is a positive integer;

N-stage shift registers connected to said frequency divider, which receives said reference pulse signal with the 1/N frequency, and which sequentially shifts said reference pulse signal to product N clock pulse signals;

counters of N arranged in parallel to each other, which receive said detection signal from said detector means and receive said N clock pulse signals, respectively, to count time intervals between logic level changing points on the basis of said N clock pulse signals, respectively; and adding means connected to said counters, for receiving and adding the output data from said counters of N.

10. A circuit as in claim 1 further comprising a digital audio disk system wherein said circuit is used within said system.

* * * * *